United States Patent
Dietsch et al.

(10) Patent No.: US 10,392,519 B2
(45) Date of Patent: Aug. 27, 2019

(54) COMPOSITION COMPRISING SILVER NANOWIRES AND FIBERS OF CRYSTALLINE CELLULOSE FOR THE PREPARATION OF ELECTROCONDUCTIVE TRANSPARENT LAYERS

(71) Applicant: BASF SE, Ludwigshafen (DE)

(72) Inventors: Herve Dietsch, Bad Duerkheim (DE); Thomas Sturm, Schifferstadt (DE); Danny Seyfried, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 249 days.

(21) Appl. No.: 15/503,951

(22) PCT Filed: Aug. 11, 2015

(86) PCT No.: PCT/EP2015/068470
§ 371 (c)(1),
(2) Date: Feb. 14, 2017

(87) PCT Pub. No.: WO2016/023904
PCT Pub. Date: Feb. 18, 2016

(65) Prior Publication Data
US 2017/0166760 A1 Jun. 15, 2017

(30) Foreign Application Priority Data
Aug. 15, 2014 (EP) .................................. 14181193

(51) Int. Cl.
| | | |
|---|---|---|
| *C09D 5/24* | (2006.01) | |
| *B82Y 30/00* | (2011.01) | |
| *C09D 11/52* | (2014.01) | |
| *B05D 1/28* | (2006.01) | |
| *C09D 11/14* | (2006.01) | |
| *C09D 101/02* | (2006.01) | |
| *H01B 1/02* | (2006.01) | |
| *H01B 13/00* | (2006.01) | |
| *C09D 7/40* | (2018.01) | |
| *B82Y 40/00* | (2011.01) | |
| *C08K 7/24* | (2006.01) | |

(52) U.S. Cl.
CPC ............... *C09D 5/24* (2013.01); *B05D 1/28* (2013.01); *B82Y 30/00* (2013.01); *C09D 7/70* (2018.01); *C09D 11/14* (2013.01); *C09D 11/52* (2013.01); *C09D 101/02* (2013.01); *H01B 1/026* (2013.01); *H01B 13/0036* (2013.01); *B82Y 40/00* (2013.01); *C08K 7/24* (2013.01); *Y10S 977/762* (2013.01); *Y10S 977/796* (2013.01); *Y10S 977/81* (2013.01); *Y10S 977/892* (2013.01); *Y10S 977/932* (2013.01)

(58) Field of Classification Search
CPC ...... C09D 11/14; C09D 11/52; C09D 101/02; C09D 5/24
See application file for complete search history.

(56) References Cited

U.S. PATENT DOCUMENTS

| | | |
|---|---|---|
| 4,414,370 A | 11/1983 | Hamielec et al. |
| 4,529,787 A | 7/1985 | Schmidt et al. |
| 4,546,160 A | 10/1985 | Brand et al. |
| 5,508,366 A | 4/1996 | Andrist et al. |
| 7,999,045 B2 | 8/2011 | Manders et al. |
| 8,049,333 B2 | 11/2011 | Alden et al. |
| 9,150,746 B1 * | 10/2015 | Li .......................... C09D 11/52 |
| 9,183,968 B1 * | 11/2015 | Li .......................... C09D 11/52 |
| 9,620,286 B2 * | 4/2017 | Nogi ..................... H01G 4/203 |
| 2008/0182090 A1 | 7/2008 | Rouse et al. |
| 2009/0321113 A1 | 12/2009 | Allemand et al. |
| 2014/0205853 A1 | 7/2014 | Funakubo et al. |
| 2016/0096967 A1 * | 4/2016 | Virkar ..................... G02B 1/14 |
| | | 428/215 |

FOREIGN PATENT DOCUMENTS

| | | | |
|---|---|---|---|
| CN | 103440907 | * | 12/2013 |
| CN | 103440907 A | | 12/2013 |
| FR | 3034683 | * | 10/2016 |
| JP | 2013-256546 A | | 12/2013 |
| JP | 2014-55323 A | | 3/2014 |
| TW | 200907519 A | | 2/2009 |
| WO | 2009/017852 A2 | | 2/2009 |
| WO | 2010/127451 A1 | | 11/2010 |

OTHER PUBLICATIONS

Translation of CN 103440907 (no date).*
Hirotaka Koga, et al., "Uniformly connected conductive networks on cellulose nanofiber paper for transparent paper electronics," NPG Asia Materials, vol. 6, No. 3, XP055169643, Mar. 21, 2014, pp. 1-8.
International Search Report dated Oct. 15, 2015 in PCT/EP2015/068470 filed Aug. 11, 2015.
Extended European Search Report dated Mar. 3, 2015 in EP 14181193 .5 filed Aug. 15, 2014.
Combined Office Action and Search Report dated Jan. 18, 2019 in Taiwanese Patent Application No. 104126369, 11 pages (with English translation).

* cited by examiner

*Primary Examiner* — Marc S Zimmer
(74) *Attorney, Agent, or Firm* — Oblon, McClelland, Maier & Neustadt, L.L.P.

(57) ABSTRACT

Described is a composition suitable for the preparation of an electroconductive transparent layer, said composition comprising silver nanowires and fibers of crystalline cellulose.

13 Claims, No Drawings

COMPOSITION COMPRISING SILVER NANOWIRES AND FIBERS OF CRYSTALLINE CELLULOSE FOR THE PREPARATION OF ELECTROCONDUCTIVE TRANSPARENT LAYERS

The present invention relates to a composition suitable for the preparation of an electroconductive transparent layer, a method for preparing an electroconductive transparent layer, an electroconductive transparent layer comprising or consisting of solid constituents of said composition, an article comprising said electroconductive transparent layer, and to the use of said composition for the preparation of said electroconductive layer or said article, respectively.

The term "electroconductive transparent layer" as used herein refers to a layer which (i) is capable of allowing the flow of an electric current when an appropriate voltage is applied and (ii) has a light transmission of 80% or more in the visible region (400-700 nm) measured according to ASTM D1003, see e.g. U.S. Pat. No. 8,049,333. Usually, said layer is arranged on the surface of a substrate, wherein said substrate is typically an electrical isolator. Such electroconductive transparent layers are widely used in flat liquid crystal displays, touch panels, electroluminescent devices, thin film photovoltaic cells, as anti-static layers and as electromagnetic wave shielding layers.

Typically, such electroconductive transparent layer is a composite comprising (i) an optically transparent contiguous solid phase (also referred to as a matrix) and (ii) a conductive network of electroconductive nanoobjects which extends throughout said matrix. The matrix is formed of one or more optically transparent polymers. Said matrix binds the electroconductive nanoobjects within the layer, fills the voids between said nanoobjects, provides mechanical integrity and stability to the layer and binds the layer to the surface of the substrate. The conductive network of electroconductive nanoobjects allows for the flow of an electric current between adjacent and overlapping electroconductive nanoobjects within the layer. Due to the small dimensions of the nanoobjects, their influence on the optical behavior of the composite is quite small, thus allowing for the formation of an optically transparent composite, i.e. a composite having a light transmission of 80% or more in the visible region (400-700 nm) measured according to ASTM D1003, see e.g. U.S. Pat. No. 8,049,333.

Typically, such electroconductive transparent layers are prepared by applying a composition comprising sufficient amounts of
  (i) one or more matrix-forming binding agents,
  (ii) electroconductive nanoobjects and
  (iii) optionally auxiliary constituents
dissolved or dispersed in a suitable liquid (preferably water) to a surface of a substrate, and removing those constituents which at 25° C. and 101.325 kPa are liquid (hereinbelow referred to as the liquid constituents) from said composition applied to said surface of said substrate to such extent that on said surface of said substrate an electroconductive transparent layer is formed which comprises constituents of the applied composition which at 25° C. and 101.325 kPa are solid (hereinbelow referred to as solid constituents). Such a composition for the preparation of an electroconductive transparent layer is commonly referred to as an ink.

Koga et al. disclose in Biomacromolecules 2013, 14, 1160-1165, an electroconductive composite film comprising carbon nanotubes and cellulose nanofibrils isolated from native wood cellulose by means of 2,2,6,6-tetramethylpiperidine-1-oxyl (TEMPO)-mediated oxidation and successive mechanical treatment in water. The composite films are characterized as translucent and have a transmittance of less than 80% in the visible region (400-700 nm). Furthermore, sheet resistances of 300 Ohms/square and 1.2 kOhms/square are reported. Haze values are not disclosed.

Koga et al. (NPG ASIA MATERIALS, vol. 6, no. 3, 21 Mar. 2014 (Mar. 21, 2014), page e93) describe the fabrication of highly transparent conductive networks on a cellulose nanofiber paper.

WO 2009/017852 A2 describes methods of enhancing the contrast ratio of conductive nanostructure-based transparent conductors.

US 2014/0205853 A1 discloses a transparent conductive coating film comprising at least a metal nanowire, wherein the transparent conductive coating film has a ratio of a bent wire in the metal nanowire of 10% or less, a surface resistivity of 150 Ohms/square or less, and a haze value of 1.0% or less. CN 103440907 A discloses a cellulose nanofiber and silver nanowire composite conductive thin film which comprises 50-60 wt. % silver nanowire and 30-40 wt. % cellulose nanofiber.

JP 2014-055323 A discloses a metal/cellulose fine fiber which is used in dispersion for a transparent conductive film.

JP, 2013-256546 A discloses a cellulose nanofiber which has a crystallinity degree of 70% or more, a polymerization degree of 160 or less as measured by viscosity method using copper ethylenediamine solution, and a fiber diameter of 50 nm or less.

It is an object of the present invention to provide an ink suitable for the preparation of an electroconductive transparent layer having a light transmission of 80% or more measured according to ASTM D1003 (Procedure A) and a sheet resistance of less than 300 Ohm/square as measured by the four point probe. Further preferably, said electroconductive transparent layer shall exhibit a haze of 2% or less as measured according to ASTM D1003 (Procedure A), and a sheet resistance of less than 300 Ohm/square as measured by the four point probe. In the context of the present invention, any reference to ASTM D1003 refers to the version published in November 2013.

These and other objects are achieved by a composition according to the present invention, said composition comprising the constituents
  (A) water,
  (B) electroconductive nanoobjects,
    said electroconductive nanoobjects (B) having two external dimensions in the range of from 1 nm to 100 nm and their third external dimension in the range of from 1 μm to 100 μm,
    wherein said electroconductive nanoobjects (B) comprise one or more materials selected from the group consisting of silver, copper and gold,
    wherein the weight fraction of said electroconductive nanoobjects (B) is in the range of from 0.01 wt.-% to 1 wt.-% based on the total weight of the composition,
  (C) dispersed in the water, fibers of crystalline cellulose,
    said dispersed fibers (C) of crystalline cellulose having a length in the range of from 80 nm to 300 nm and a diameter in the range of from 5 nm to 30 nm,
    wherein the total weight fraction of said dispersed fibers (C) of crystalline cellulose is in the range of from 0.02 wt.-% to 5 wt.-%, based on the total weight of the composition.

Hereinbelow, a composition according to the invention (as defined above) is also referred to as an ink.

Surprisingly, it has been found that a composition as defined above is suitable for the preparation of electroconductive transparent layers having superior optical properties as well as satisfying electronic conductivity.

In the composition according to the invention (as defined above), the main constituent which at 25° C. and 101.325 kPa is liquid is water (A), and the main constituents which at 25° C. and 101.325 kPa are solid are the above-defined electroconductive nanoobjects (B) and the above-defined fibers (C) of crystalline cellulose. In the composition according to the present invention (as defined above), the total concentration of constituents which at 25° C. and 101.325 kPa are solid (solid constituents) is 10 wt.-% or less, preferably 8 wt.-% or less, further preferably 5 wt.-% or less, in each case based on the total weight of said composition.

According to ISO/TS 27687:2008 (as published in 2008), the term "nanoobject" refers to an object having one, two or three external dimensions in the nanoscale, i.e. in the size range from approximately 1 nm to 100 nm. The electroconductive nanoobjects (B) to be used for the present invention are electroconductive nanoobjects having two external dimensions in the range of from 1 nm to 100 nm and their third external dimension in the range of from 1 μm to 100 μm. Typically, said two external dimensions which are in the range of from 1 nm to 100 nm are similar i.e. they differ in size by less than three times. The third dimension of said electroconductive nanoobjects (B) is significantly larger, i.e. it differs from the other two external dimensions by more than three times.

According to ISO/TS 27687:2008 (as published in 2008), nanoobjects having two similar external dimensions in the nanoscale, while the third external dimension is significantly larger, are generally referred to as nanofibers. Electrically conductive nanofibers are also referred to as nanowires. Hollow nanofibers (irrespective of their electrical conductivity) are also referred to as nanotubes.

Electroconductive nanoobjects (B) as defined above which are to be used for the present invention typically have a cross section close to circular shape. Said cross section extends perpendicularly to said external dimension which is in the range of from 1 μm to 100 μm. Thus, said two external dimensions which are in the nanoscale are defined by the diameter of said circular cross section. Said third external dimension extending perpendicularly to said diameter is referred to as the length.

Preferably, a composition according to the present invention comprises electroconductive nanoobjects (B) having a length in the range of from 1 μm to 100 μm, preferably of from 3 μm to 50 μm, more preferably of from 10 μm to 50 μm and a diameter in the range of from 1 nm to 100 nm, preferably of from 2 nm to 50 nm, more preferably of from 3 nm to 30 nm.

Preferably, in the composition according to the invention (as defined above) the weight fraction of said electroconductive nanoobjects (B) as defined above is 0.8 wt.-% or less, preferably 0.5 wt-% or less, based on the total weight of the composition. The weight fraction of said electroconductive nanoobjects (B) is not less than 0.01 wt.-%, based on the total weight of the composition, because a weight fraction of less than 0.01 wt.-% of electroconductive nanoobjects (B) may be not sufficient for forming a conductive network, so that such composition is not suitable for preparing an electroconductive layer. Further preferably the weight fraction of said electroconductive nanoobjects (B) is not less than 0.02 wt.-%, preferably not less than 0.05 wt.-%.

Preferably, in the composition according to the invention (as defined above), the total weight fraction of said dispersed fibers (C) of crystalline cellulose is less than 2 wt.-%, more preferably 1.8 wt.-% or less, further preferably 1.5 wt.-% or less, especially preferably 1 wt.-% or less, based on the total weight of the composition. The total weight fraction of said dispersed fibers (C) of crystalline cellulose is not less than 0.02 wt.-%, based on the total weight of the composition, because a total weight fraction of less than 0.02 wt.-% of said dispersed fibers (C) of crystalline cellulose may be not sufficient for binding the electroconductive nanoobjects (B) so that such composition is not suitable for preparing an electroconductive layer. Further preferably the total weight fraction of said dispersed fibers (C) of crystalline cellulose not less than 0.05 wt.-%, preferably not less than 0.1 wt.-%.

Preferably, in the composition according to the present invention (as defined above), the ratio between the total weight of said electroconductive nanoobjects (B) and the total weight of said dispersed fibers (C) of crystalline cellulose is in the range of from 1:20 to 20:1, preferably from 1:10 to 5:1, further preferably from 1:5 to 5:1.

The term "electroconductive nanoobject" means that the nanoobject comprises or consists of one or more materials capable of allowing the flow of electrons. Accordingly, a plurality of such electroconductive nanoobjects may form a conductive network of adjacent and overlapping electroconductive nanoobjects extending throughout said matrix capable of carrying an electric current, provided that there is sufficient interconnection (mutual contact) between individual electroconductive nanoobjects so as to enable the transport of electrons along the interconnected electroconductive nanoobjects within the network.

The electroconductive nanoobjects (B) to be used for the present invention comprise or consist of one or more materials selected from the group consisting of silver, copper, and gold.

Preferably, the electroconductive nanoobjects (B) have a length in the range of from 1 μm to 100 μm and a diameter in the range of from 1 nm to 100 nm, wherein said electroconductive nanoobjects (B) comprise one or more materials selected from the group consisting of silver, copper, gold and carbon.

Preferably, said electroconductive nanoobjects (B) are selected from the group consisting of nanowires. Nanowires to be used as electroconductive nanoobjects (B) for the present invention comprise or consist of one or more metals selected from the group consisting of silver, copper and gold. Preferably, said nanowires each comprise at least 50 wt.-% of one or more metals selected from the group consisting of silver, copper and gold, based on the total weight of said nanowire. Most preferred are nanowires each comprising 50 wt.-% or more of silver based on the total weight of said nanowire (hereinbelow also referred to as "silver nanowires").

Most preferred electroconductive nanoobjects (B) according to the present invention are silver nanowires having the above-mentioned dimensions.

Suitable electroconductive nanoobjects (B) as defined above are known in the art and are commercially available.

Silver nanowires (as well as nanowires of other metals) are typically commercially available in the form of an aqueous dispersion wherein polyvinylpyrrolidone is adsorbed onto the surface of the silver nanowires in order to render the dispersion stable. Any matter adsorbed on the surface of the nanowires is not included in the above-defined dimensions and composition of the electroconductive nanoobjects (B).

Preferably, the silver nanowires are obtained by the procedure described by Yugang Sun and Younan Xia in Adv. Mater 2002 14 No. 11, June 5, pages 833-837.

In preferred embodiments the composition according to the present invention does not comprise carbon nanotubes.

Constituent (C) of the composition according to the present invention (as defined above) consists of fibers of crystalline cellulose, said dispersed fibers (C) of crystalline cellulose having a length in the range of from 80 nm to 300 nm and a diameter in the range of from 5 nm to 30 nm. Preferably, said dispersed fibers (C) of crystalline cellulose having a length in the range of from 80 nm to 150 nm and a diameter in the range of from 5 nm to 10 nm. Said fibers (C) are also referred to as nanocrystalline cellulose or cellulose nanofibers or cellulose II (see WO 2010/127451). They are obtainable by disrupting the amorphous domains of natural cellulose fibers and disintegration of the micrometer-sized cellulose fibers into rod-like rigid crystallites. The obtained crystallites typically have the above-mentioned dimensions.

More specifically, crystalline cellulose fibers having the above-mentioned dimensions are obtainable by chemical treatment or by enzymatic treatment or by mechanical treatment of natural cellulose fibers or by combinations of different types of treatment, e.g. chemical treatment (e.g. with sulfuric acid or sodium chlorite) or enzymatic treatment followed by high-pressure homogenization, or by milling of natural cellulose fibers and subsequent hydrolysis to remove amorphous regions.

Due to their dimensions, said fibers (C) do not scatter visible light.

When an aqueous dispersion of fibers (C) of crystalline cellulose is dried, the cellulose fibers (C) are densely packed together by capillary action during the evaporation of the water. Accordingly, said cellulose fibers (C) are capable of forming a matrix and binding the electroconductive nanoobjects (B) so as to form an electroconductive transparent layer. Furthermore, due to their outstanding mechanical stability, said fibers (C) impart mechanical reinforcement to the obtained electroconductive transparent layer.

Due to their external dimensions, said fibers are nanoobjects in the sense of to ISO/TS 27687:2008 (as published in 2008), and the above statements relating to the external dimensions of nanoobjects are applicable to said fibers (C). However, said fibers (C) do not comprise any materials capable of allowing the flow of electrons, and therefore they are not electroconductive nanoobjects (B) as defined above.

Preferably, said fibers (C) of crystalline cellulose are fibers of sulfated crystalline cellulose. They are obtainable by treatment of cellulose with sulfuric acid. Fibers (C) of this kind of crystalline cellulose contain sulfur in the form of sulfate groups. Especially preferred are fibers of sulfated crystalline cellulose II obtainable by be the process described in WO 2010/127451. Said sulfated crystalline cellulose II has a degree of polymerization of 60 or below. For further details, reference is made to WO 2010/127451.

Preferably, the composition according to the present invention does not comprise fibers of crystalline cellulose obtained by means of 2,2,6,6-tetramethylpiperidine-1-oxyl (TEMPO)-mediated oxidation of cellulose. This kind of crystalline cellulose fibers exhibits a high density of carboxylate groups on their surfaces. Said carboxylate groups are formed by oxidation of primary hydroxyl groups of cellulose.

Suitable fibers (C) of crystalline cellulose are commercially available, e.g. from Celluforce.

In preferred embodiments the composition according to the present invention (as defined above) consists of the constituents (A), (B) and (C) as defined above.

In alternative preferred embodiments, the composition according to the present invention (as defined above) comprises one or more further constituents which are capable of coacting with the above-defined fibers (C) of crystalline cellulose in forming a matrix and binding the above-defined electroconductive nanoobjects (B). Those constituents are referred to as additional binding agents and belong to the solid constituents of the composition. Those additional binding agents are selected from the group of substances which are capable of forming a matrix and binding the above-defined electroconductive nanoobjects (B) in the absence of any fibers (C) of crystalline cellulose (as defined above). Those additional binding agents are not selected from the group consisting of fibers (C) of crystalline cellulose as defined above and electroconductive nanoobjects (B) as defined above. Preferably, the total weight fraction of said additional binding agents (based on the total weight of the composition) is equal to or less than the total weight fraction of said dispersed fibers (C) of crystalline cellulose based on the total weight of the composition.

In the composition according to the invention, the total weight fraction of said dispersed fibers (C) of crystalline cellulose and said one or more additional binding agents as defined above is preferably 7.5 wt.-% or less, preferably 3 wt.-% or less, further preferably 2.25 wt.-% or less, based on the total weight of the composition. Preferably, the total weight fraction of said additional binding agents (based on the total weight of the composition) is equal to or less of the total weight fraction of said dispersed fibers (C) of crystalline cellulose based on the total weight of the composition.

Preferably, said additional binding agents comprised by the composition according to the present invention (as defined above) are selected from the group consisting of
 (D) dispersed in the water, particles of a polymer having a number average molecular weight of 25000 g/mol or higher,
  wherein said dispersed particles (D) have a mean diameter in the range of from 10 nm to 1000 nm,
 (E) dissolved in the water one or more styrene/(meth)acrylic copolymers,
  said dissolved copolymers (E) each having a number average molecular weight in the range of from 500 g/mol to 22000 g/mol,
 (F) dissolved in the water, one or more water-soluble polymers selected from the group consisting of hydroxypropyl methyl cellulose, carboxymethyl cellulose, polyacrylamide, polyvinylalcohol, polyvinylpyrrolidone, polystyrenesulfonic acid and dextran.

Said particles (D) of a polymer having a number average molecular weight of 25000 g/mol or higher are polymer beads each consisting of several entangled polymer chains. Said polymer beads are dispersed as a disperse phase in an aqueous dispersion medium Said polymer beads have a mean diameter in the range from 10 nm to 1000 nm, in particular in the range from 50 nm to 600 nm determined by dynamic light scattering on an aqueous polymer dispersion (from 0.005 to 0.01 percent by weight) at 23° C. by means of an Autosizer IIC from of Malvern Instruments, England. Such aqueous polymer dispersions are obtainable in particular by free-radically initiated aqueous emulsion polymerization of ethylenically unsaturated monomers. Preferably, the number average molecular weight of the polymer of the particles (D) is not higher than 200000 g/mol. For further details, reference is made to U.S. Pat. No. 7,999,045 B2 and the prior art cited therein as well as to the patent application "Composition comprising silver nanowires and dispersed polymer beads for the preparation of electroconductive transparent layers" filed by the same assignee on the same day like the present application.

Said styrene/(meth)acrylic copolymers (E) are water soluble. In said copolymers (E) each molecule comprises or consists of units derived from monoalkenyl aromatic monomers and units derived from (meth)acrylic monomers in copolymerized form. Such copolymers are obtainable by copolymerisation of one or more kinds of monoalkenyl aromatic monomers with one or more kinds of (meth)acrylic monomers. Herein, the term "(meth)acrylic" includes "methacrylic" and "acrylic". The number average molecular weight of each of said copolymers (E) is in the range of from 500 g/mol to 22000 g/mol, preferably of from 1700 g/mol to 15500 g/mol, further preferably of from 5000 g/mol to 10000 g/mol. For further details regarding said copolymers (E), reference is made to US 2008/0182090, U.S. Pat. Nos. 4,414,370, 4,529,787, 4,546,160, 5,508,366 and the prior art cited therein, as well as to the patent application "Composition comprising silver nanowires and styrene/(meth) acrylic copolymers for the preparation of electroconductive transparent layers" filed by the same assignee on the same day like the present application.

Typically, the water-soluble copolymers (E) are amphiphilic, because their molecules contain non-polar hydrophobic regions derived from the monoalkenyl aromatic monomers and polar hydrophilic regions derived from the (meth) acrylic monomers. Thus, the desired amphiphilic behavior is obtainable by appropriate selection of the hydrophobic monoalkenyl aromatic monomers and the hydrophilic (meth)acrylic monomers and appropriate adjustment of the ratio between monoalkenyl aromatic monomers and (meth) acrylic monomers so that a copolymer is obtained which has an appropriate ratio between hydrophobic units derived from monoalkenyl aromatic monomers and hydrophilic units derived from (meth)acrylic monomers to allow for amphiphilic behavior of the copolymer. In aqueous solution said water-soluble copolymers (E) behave like surfactants (tensides), i.e. they are capable of forming micelles. A micelle is an aggregate formed by association of dissolved amphiphilic molecules. Preferably said micelles have a diameter of up to 5 nm.

Suitable additional binding agents, especially those defined above as (D), (E) and (F), are known in the art and are commercially available.

In a specific preferred embodiment, the composition according to the present invention comprises or consists of the above-defined constituents (A), (B) and (C), and
  (D) dispersed in the water particles of a polymer having a number average molecular weight of 25000 g/mol or higher,
    wherein said dispersed particles (D) have a largest dimension in the range of from 10 nm to 1000 nm,
  and no further additional binding agent,
  wherein the total weight fraction of said particles (D), based on the total weight of the composition, is equal to or less than the total weight fraction of said dispersed fibers (C) of crystalline cellulose based on the total weight of the composition.

In another specific preferred embodiment, the composition according to the present invention comprises or consists of the above-defined constituents (A), (B) and (C), and
  (E) dissolved in the water one or more styrene/(meth) acrylic copolymers,
    said dissolved copolymers (E) each having a number average molecular weight in the range of from 500 g/mol to 22000 g/mol,
  and no further additional binding agent,
  wherein the total weight fraction of said dissolved copolymers (E), based on the total weight of the composition, is equal to or less than the total weight fraction of said dispersed fibers (C) of crystalline cellulose based on the total weight of the composition.

In another preferred embodiment, the composition according to the present invention comprises or consists of the above-defined constituents (A), (B) and (C), and
  (F) one or more water-soluble polymers as defined above and no further additional binding agent,
  wherein the total weight fraction of said one or more water-soluble polymers (F), based on the total weight of the composition, is equal to or less than the total weight fraction of said dispersed fibers (C) of crystalline cellulose based on the total weight of the composition.

The composition according to the present invention optionally comprises further constituents beside the above-defined constituents (A) to (C), e.g. defoaming agents, rheological controlling agents, corrosion inhibitors and other auxiliary agents. Typical defoaming agents, rheological controlling agents and corrosion inhibitors are known in the art and commercially available. However, surprisingly it has been found that compositions according to the invention (as defined above) which do not contain any further constituents beyond the above-defined constituents (A)-(C) and optionally one or more of above-defined constituents (D)-(F) are suitable for the preparation of electroconductive transparent layers having superior optical properties as well as satisfying electronic conductivity. Accordingly, the addition of any auxiliary agents can be omitted, thus rendering the composition less complex and facilitating preparation of such composition. Accordingly, in preferred embodiments a composition according to the present invention consists of above-defined constituents (A)-(C) and optionally one or more of above-defined constituents (D)-(F). Nevertheless, in certain embodiments the composition according to the present invention (as defined above) comprises one or more auxiliary agents, especially those as defined above.

It is understood that any further constituents (beside the above-defined constituents (A) to (C)) of the composition according to the present invention (as defined above) as well as the amounts of such further constituents have to be selected in such manner that the electrical conductivity and the optical properties of a layer obtainable from said composition are not compromised.

Preferred compositions according to the present invention are those wherein two or more of the above-defined preferred features are combined.

Particularly preferred is a composition according to the present invention, said composition comprising or consisting of
  (A) water
  (B) silver nanowires
    said silver nanowires (B) having a length in the range of from 10 μm to 50 μm and a diameter in the range of from 3 nm to 30 nm,
    wherein the weight fraction of said silver nanowires (B) is 0.5 wt.-% or less, based on the total weight of the composition,
  (C) dispersed in the water, fibers of sulfated crystalline cellulose,
    said dispersed fibers (C) of sulfated crystalline cellulose having a length in the range of from 80 nm to 150 nm and a diameter in the range of from 5 nm to 10 nm, wherein the weight fraction of said dispersed fibers (C) of crystalline cellulose is less than 2 wt.-%, preferably 1.5 wt.-% or less, based on the total weight of the composition, wherein the ratio between the total weight of said silver nanowires (B)

and the weight of said dispersed fibers (C) of sulfated crystalline cellulose is in the range of from 1:5 to 5:1.

A composition according to the present invention is preparable e.g. by suspending in water an appropriate amount of the above-defined electroconductive nanoobjects (B) and an appropriate amount of said fibers (C) of crystalline cellulose, or by combining appropriate amounts of a pre-manufactured aqueous suspension of said electroconductive nanoobjects (B) and of a pre-manufactured aqueous suspension of said fibers (C) of crystalline cellulose, or by suspending an appropriate amount of said electroconductive nanoobjects (B) in a pre-manufactured aqueous suspension of said fibers (C) of crystalline cellulose or by suspending an appropriate amount of said fibers (C) of crystalline cellulose in a pre-manufactured aqueous suspension of said electroconductive nanoobjects (B). In preferred embodiments, after combining the constituents (A)-(C) and optionally further constituents (as defined above), the composition is subjected to ball-milling or other suitable techniques in order to improve homogenization of the composition. In certain embodiments, a prolonged homogenization treatment is preferably in order to ensure that the obtained layers have a low haze.

A further aspect of the present invention relates to a method for preparing on a substrate an electroconductive layer having a light transmission of 80% or more measured according to ASTM D1003 (Procedure A). Said method according to the present invention comprises the steps of:

preparing or providing a composition according to the present invention as defined above, applying said composition to a surface of a substrate, removing constituents which at 25° C. and 101.325 kPa are liquid from said composition applied to said surface of said substrate to such extent that a layer is formed on said surface of said substrate.

The layer formed by the above-defined process of the invention is a solid electroconductive layer having a light transmission of 80% or more measured according to ASTM D1003 (Procedure A), said layer comprising or consisting of solid constituents of said composition according to the present invention as defined above.

In the context of the present application, the process step of removing constituents which at 25° C. and 101.325 kPa are liquid from said composition applied to said surface of said substrate to such extent that a layer is formed on said surface of said substrate is also referred to as drying. Usually, the liquid constituents are removed by evaporation.

Generally, the liquid constituents have to be removed at least to such extent that on said surface of said substrate an electroconductive layer is formed, wherein the fibers (C) of crystalline cellulose form a contiguous solid phase (also referred to as a matrix) binding to the electroconductive nanoobjects (B) which in turn form a conductive network extending throughout said solid matrix. In said matrix the fibers (C) of crystalline cellulose are densely packed together. Preferably, said electroconductive layer has a thickness in the range of from 10 nm to 1000 nm, preferably of from 50 nm to 500 nm. Generally, the lower limit of the thickness of the electroconductive layer is determined by the smallest dimension of the nanoobjects of the applied composition.

Preferably the constituents which at 25° C. and 101.325 kPa are liquid are completely removed from said composition applied to said surface of said substrate.

Applying said composition according to the invention to said surface of said substrate is preferably carried out by means of a technique selected from the group consisting of spin coating, draw down coating, roll-to-roll coating, gravure printing, microgravure printing, screen-printing, flexo-printing and slot-die coating.

Preferably, said composition is applied to said surface of said substrate in a thickness in a range of from 1 μm to 200 μm, preferably of from 2 μm to 60 μm. Said thickness is also referred to as "wet thickness" and relates to the state before removing the liquid constituents of the composition as explained above. At a given target thickness (after removing the liquid constituents of the composition as explained above) and accordingly a given target sheet resistance and light transmission of the electroconductive layer to be prepared, the wet thickness may be the higher the lower the concentration of solid constituents in the composition is in the ink. The process of applying the ink is facilitated when there is no constraint to apply the ink in a particular low wet thickness.

Said substrate to which said composition according to the present invention (as defined above) is applied is typically an electrical isolator. Preferably said substrate comprises or consists of a material selected from the group consisting of glass and organic polymers. Preferred organic polymers are selected from the group consisting of polycarbonate (PC), cyclic olefin copolymer (COP), polyvinylidene fluoride (PVDF), polyimide (PI) and polyethylene terephthalate (PET). Preferably, said substrate has a light transmission of 80% or more measured according to ASTM D1003 (Procedure A).

Removing (to such extent as explained above) of those constituents which are liquid at 25° C. and 101.325 kPa from said composition applied to said surface of said substrate is to preferably achieved by subjecting said composition applied to said surface of said substrate to a temperature in the range of from 100° C. to 150° C. for a duration of 15 minutes or less. In this regard, the skilled person is aware that said temperature has to be selected under consideration of the thermal stability of the substrate.

Preferred methods according to the present invention are those wherein two or more of the above-defined preferred features are combined.

Regarding the method for preparing an electroconductive layer (as defined above) according to the present invention, the skilled person based on its knowledge adjusts the composition of the ink and all process parameters (of the preparation of the ink as well as of the preparation of the electroconductive layer) in a suitable manner, in order to optimize the sheet resistance and the optical properties of the electroconductive layer, taking into account the technical features of the selected substrate and the available technique for applying the composition according to the invention to the surface of the substrate. If necessary, suitable compositions of the ink and/or process parameters can be easily identified by test procedures known to the person skilled in the art, which do not require undue experimentation.

A further aspect of the present invention relates to an electroconductive layer having a light transmission of 80% or more as measured according to ASTM D1003 (Procedure A) and a sheet resistance of less than 300 Ohm/square as measured by the four point probe, wherein said electroconductive layer comprises or consists of the solid constituents of a composition according to the present invention as defined above. In said electroconductive layer the fibers (C) of crystalline cellulose form a contiguous solid phase (also referred to as a matrix) binding the electroconductive nanoobjects (B) which in turn form a conductive network extending throughout said solid matrix. In said solid matrix the fibers (C) of crystalline cellulose are densely packed together. Said electroconductive layer is obtainable by the above-defined method according to the present invention.

Light transmission" refers to the percentage of an incident light which is transmitted through a medium. Preferably the light transmission of an electroconductive layer according to the present invention is 85% or more, more preferably 90% or more, further preferably 95% or more, in each case measured according to ASTM D1003 (Procedure A).

A preferred electroconductive layer according to the present invention exhibits a haze of 2% or less as measured according to ASTM D1003 (Procedure A), and/or a sheet resistance of 200 Ohm/square or less as measured by the four point probe.

Preferably the haze of an electroconductive layer according to the present invention is 1.8% or less, more preferably 1.5% or less, further preferably 1.2% or less, in each case measured according to ASTM D1003 (Procedure A).

Preferably the sheet resistance of an electroconductive layer according to the present invention is 200 Ohm/square or less, more preferably 180 Ohm/square or less, further preferably 150 Ohm/square or less, in each case measured by the four point probe.

The measurement of haze and light transmission (in ASTM D1003 referred to as luminous transmittance which is the ratio of the luminous flux transmitted by a body to the flux incident upon it) by means of a hazemeter is defined in ASTM-D1003 as "Procedure A—Hazemeter". The values of haze and light transmission (corresponding to the luminous transmittance as defined in ASTM D1003) given in the context of the present invention refer to this procedure.

Generally, haze is an index of the light diffusion. It refers to the percentage of the quantity of light separated from the incident light and scattered during transmission. Unlike light transmission, which is largely a property of the medium, haze is often a production concern and is typically caused by surface roughness, and by embedded particles or compositional heterogeneities in the medium.

According to ASTM D1003, in transmission, haze is the scattering of light by a specimen responsible for the reduction in contrast of objects viewed through said specimen, i.e. the percent of transmitted light that is scattered so that its direction deviates more than a specified angle (2.5°) from the direction of the incident beam.

The sheet resistance is a measure of resistance of a thin body (sheet) namely uniform in thickness. The term "sheet resistance" implies that the current flow is along the plane of the sheet, not perpendicular to it. For a sheet having a thickness t, a length L and a width W, the resistance R is $$R = \rho * \frac{L}{Wt} = \frac{\rho}{t} * \frac{L}{W} = R_{sh} * \frac{L}{W}$$

wherein $R_{sh}$ is the sheet resistance. Accordingly the sheet resistance $R_{sh}$ is $$R_{sh} = R * \frac{W}{L}$$

In the formula given above the bulk resistance R is multiplied with a dimensionless quantity (W/L) to obtain the sheet resistance $R_{sh}$, thus the unit of sheet resistance is Ohms. For the sake of avoiding confusion with the bulk resistance R, the value of the sheet resistance is commonly indicated as "Ohms per Square" because in the specific case of a square sheet W=L and R=$R_{sh}$. The sheet resistance is measured by means of a four point-probe.

Further details of the measurement of the sheet resistance and the haze are given below in the examples section.

More preferably, an electroconductive layer according to the present invention exhibits one or more of the following features:
  a haze of 1% or less as measured according to ASTM D1003 (procedure A),
  a sheet resistance of 100 Ohm/square or less as measured by the four point probe,
  a light transmission of 90% or more as measured according to ASTM D1003 (procedure A).

Preferred electroconductive layers according to the present invention are those wherein two or more of the above-defined preferred features are combined.

A particularly preferred electroconductive layer according to the present invention exhibits the following features:
  a haze of 1% or less as measured according to ASTM D1003 (Procedure A), and
  a sheet resistance of 100 Ohm/square or less as measured by the four point probe, and
  a light transmission of 90% or more as measured according to ASTM D1003 (Procedure A).

A further aspect of the present invention relates to an article comprising a substrate having a surface and an electroconductive layer according to the invention (as defined above) arranged on at least a portion of said surface of said substrate.

Preferably, said electroconductive layer has a thickness in the range of from 10 nm to 1000 nm, preferably of from 50 nm to 500 nm. The lower limit of the thickness of the electroconductive layer is determined by the smallest dimension of the nanoobjects of the applied composition.

Said substrate is typically an electrical isolator. Preferably said substrate comprises or consists of a material selected from the group consisting of glass and organic polymers. Preferred organic polymers are selected from the group consisting of polycarbonate (PC), cyclic olefin copolymer (COP), polyvinylidene fluoride (PVDF), polyimide (PI) and polyethylene terephthalate (PET). Preferably, said substrate has a light transmission of 80% or more measured according to ASTM D1003 (Procedure A).

Preferred articles according to the present invention are those wherein two or more of the above-defined preferred features are combined.

Typical applications of electroconductive layers according to the present invention (as defined above) and articles according to the present invention (as defined above) are selected from the group consisting of transparent electrodes, touch panels, wire polarizers, capacitive and resistive touch sensors, EMI shielding, transparent heaters (e.g. for automobile and other applications), flexible displays, plasma displays, electrophoretic displays, liquid crystal displays, transparent antennas, electrochromic devises (e.g. smart windows), photovoltaic devices (especially thin-film photovoltaic cells), electroluminescent devices, light emitting devices (LED) and organic light emitting devices (OLED), flexible devices that can be worn (so-called wearables) such as flexible watches or foldable screens, as well as functional coatings imparting anti-fogging, anti-icing or antistatic properties and dielectric and ferroelectric haptic films. However the present invention is not limited by these applications and can be used in many other electro optical devices by those skilled in the art.

A further aspect of the present invention relates to the use of a composition according to the present invention (as defined above) for the preparation of an electroconductive layer according to the present invention (as defined above) or of an article according to the present invention (as defined above).

The invention is hereinafter further illustrated by means of examples.

EXAMPLES

1. Examples of Layers on Glass Substrates Obtained by Spin-Coating:

1.1 Compositions Comprising no Additional Binding Agent

An aqueous dispersion of silver nanowires (nanoobjects (B) as defined above) and an aqueous dispersion of sulfated crystalline cellulose (fibers (C) as defined above, obtainable from Celluforce) are mixed so as to obtain an ink having a concentration of silver nanowires and a weight ratio of silver nanowires (B) to dispersed sulfated crystalline cellulose fibers (C) as indicated in table 1.

The ink is spin-coated (Smart Coater 100) on glass substrates at various spin speeds (see table 1) for 60 sec to generate layers with different wet thickness. The layers are then dried at 130° C. for 5 min.

The sheet resistance Rsh given in Ohms/square (OPS) of the dried layer is measured by a four-point probe station (Lucas lab pro-4) and the optical properties are measured according to ASTM D1003, procedure A—Hazemeter by a haze-gard plus hazeometer (BYK Gardner). The results are compiled in table 1.

With regard to the optical properties, T refers to the light transmission and H refers to the haze of the substrate coated with the electroconductive layer. H (substrate subtracted) refers to the difference between the haze of the substrate coated with the electroconductive layer and the haze of the blank substrate (not coated with the electroconductive layer).

The applied amount of ink is the same in all spin coating examples. The thickness of the dried layer depends on the spin speed when using an ink of a fixed concentration. At high spin speeds there is more ink flowing away from the substrate. Thus, variation of the spin speed can be used to vary the sheet resistance and optical properties (as defined above), so as to match the requirements of different applications of transparent electroconductive layers. High spin speeds allow for generating very thin layers having high light transmission and low haze, but rather high sheet resistance. In turn, low spin speeds allow for generating thicker layers having a low sheet resistance, but a lower light transmission and a higher haze

TABLE 1

| Example No | Concentration of silver nanowires (mg/ml) | Mass ratio silver nanowires (B)/ sulfated crystalline cellulose fibers (C) | Spin Speed (rpm) | Rsh (OPS) | T (%) | H (%) | H (substrate subtracted) (%) |
|---|---|---|---|---|---|---|---|
| 1 | 2.5 | 1:2 | 750 | 95 | 92.1 | 0.6 | 0.43 |
| 2 | 2.5 | 1:2 | 1000 | 128 | 92.4 | 0.53 | 0.36 |
| 3 | 3.0 | 3:5 | 750 | 104 | 92.1 | 0.61 | 0.44 |
| 4 | 3.0 | 3:5 | 1000 | 145 | 92.2 | 0.57 | 0.4 |
| 5 | 4.0 | 1:2 | 750 | 44 | 90.3 | 1.43 | 1.26 |
| 6 | 4.0 | 1:2 | 1000 | 52 | 91.1 | 1.06 | 0.89 |

1.2 Compositions Comprising an Additional Binding Agent

An aqueous dispersion of silver nanowires (nanoobjects (B) as defined above) and an aqueous dispersion of sulfated crystalline cellulose (fibers (C) as defined above, obtainable from Celluforce) are mixed so as to obtain an ink having a concentration of silver nanowires as indicated in table 2. The aqueous dispersion of sulfated crystalline cellulose (C) comprises as an additional binding agent an amount of a dissolved styrene acrylic copolymer (Joncryl 60, commercially available from BASF, copolymer (E) as defined above). The weight ratio silver nanowires (B)/sulfated crystalline cellulose fibers (C)/copolymer (E) for each ink is indicted in table 2. The ink is spin-coated (Smart Coater 100) on glass substrates at various spin speeds (see table 2) for 60 sec to generate layers with different wet thickness. The layers are then dried at 130° C. for 5 min.

The sheet resistance (as defined above) of the dried layer is measured by a four point probe station (Lucas lab pro-4) and the optical properties (as defined above) are measured according to ASTM D1003 procedure A—Hazemeter by a haze-gard plus hazeometer (BYK Gardner). The results are compiled in table 2.

The applied amount of ink is the same in all spin coating examples. The thickness of the dried layer depends on the spin speed when using an ink of a fixed concentration. At high spin speeds there is more ink flowing away from the substrate. Thus, variation of the spin speed can be used to vary the sheet resistance and optical properties (as defined above), so as to match the requirements of different applications of transparent electroconductive layers. High spin speeds allow for generating very thin layers having high light transmission and low haze, but rather high sheet resistance. In turn, low spin speeds allow for generating thicker layers having a low sheet resistance, but a lower light transmission and a higher haze.

TABLE 2

| Example No | Concentration of silver nanowires (mg/ml) | Mass ratio silver nanowires (B)/sulfated crystalline cellulose fibers (C)/ copolymer (E) | Spin Speed (rpm) | Rsh (OPS) | T (%) | H (%) | H (substrate subtracted) (%) |
|---|---|---|---|---|---|---|---|
| 7 | 4.0 | 4:5:3 | 1000 | 27 | 89.2 | 1.87 | 1.7 |
| 8 | 4.0 | 4:5:3 | 2000 | 59 | 91.4 | 0.97 | 0.8 |

TABLE 2-continued

| Example No | Concentration of silver nanowires (mg/ml) | Mass ratio silver nanowires (B)/sulfated crystalline cellulose fibers (C)/ copolymer (E) | Spin Speed (rpm) | Rsh (OPS) | T (%) | H (%) | H (substrate subtracted) (%) |
|---|---|---|---|---|---|---|---|
| 9 | 4.0 | 4:5:3 | 2500 | 71 | 91.7 | 0.9 | 0.73 |
| 10 | 4.0 | 4:5:3 | 3000 | 92 | 91.9 | 0.72 | 0.55 |

2. Examples of Layers on Polymer Substrates Obtained by Draw-Down Coating 2.1 Compositions Comprising no Additional Binding Agent An aqueous dispersion of silver nanowires (nanoobjects (B) as defined above) and an aqueous dispersion of sulfated crystalline cellulose (fibers (C) as defined above, obtainable from Celluforce) are mixed so as to obtain an ink having a concentration of silver nanowires and a weight ratio of silver nanowires (B) to dispersed sulfated crystalline cellulose fibers (C) as indicated in table 3.

The ink is applied to a polymer substrate using a draw-down bar (wet thickness of 4 µm for examples 11-15, 6 µm for examples 16-21), coating speed v=2″/sec) to obtain a layer on said substrate. The applied layer is then dried at the temperature indicated in table 3 for 5 min. The substrate is an optical polycarbonate foil (e.g. commercially available under the product specification Makrofol DE 1-1 175 µm from Bayer Material Science).

The sheet resistance (as defined above) of the dried layer is measured by a four point probe station (Lucas lab pro-4) and the optical properties (as defined above) are measured according to ASTM D1003 procedure A—Hazemeter by a haze-gard plus hazeometer (BYK Gardner). The results are compiled in table 3.

Examples 11 to 15 show that the sheet resistance as well as the optical properties depend on the drying temperature. Thus, variation of the drying temperature can be used to vary the sheet resistance and optical properties (as defined above), so as to match the requirements of different applications of transparent electroconductive layers.

Examples 16 to 21 show that the sheet resistance as well as the haze depend on the concentration of silver nanowires. While the sheet resistance decreases with increasing amount of silver nanowires, the haze increases with an increasing concentration of silver nanowires. Thus, variation of the concentration of silver nanowires can be used to vary the sheet resistance and the haze, so as to match the requirements of different applications of transparent electroconductive layers.

TABLE 3

| Example No | Concentration of silver nanowires (mg/ml) | Mass ratio silver nanowires (B)/sulfated crystalline cellulose fibers (C) | Drying temperature (° C.) | Rsh (OPS) | T (%) | H (%) | H (substrate subtracted) (%) |
|---|---|---|---|---|---|---|---|
| 11 | 4.65 | 2:1 | 95 | 59.7 | 90.15 | 0.76 | 0.63 |
| 12 | 4.65 | 2:1 | 105 | 50.8 | 90.15 | 0.75 | 0.62 |
| 13 | 4.65 | 2:1 | 115 | 53.3 | 90.23 | 0.8 | 0.67 |
| 14 | 4.65 | 2:1 | 125 | 68 | 85.9 | 0.75 | 0.62 |
| 15 | 4.65 | 2:1 | 135 | 32.4 | 85.9 | 0.83 | 0.7 |
| 16 | 4.59 | 1:2 | 135 | 29.2 | 88.25 | 1.29 | 1.16 |
| 17 | 4.03 | 1:2 | 135 | 34.3 | 88.44 | 1.08 | 0.95 |
| 18 | 3.60 | 1:2 | 135 | 39.1 | 88.56 | 1.00 | 0.87 |
| 19 | 3.25 | 1:2 | 135 | 49.2 | 88.65 | 0.88 | 0.75 |
| 20 | 2.96 | 1:2 | 135 | 54.9 | 88.84 | 0.82 | 0.69 |
| 21 | 2.72 | 1:2 | 135 | 61 | 88.91 | 0.72 | 0.59 |

2.2 Compositions Comprising an Additional Binding Agent

An aqueous dispersion of silver nanowires (nanoobjects (B) as defined above) and an aqueous dispersion comprising sulfated crystalline cellulose (fibers (C) as defined above, obtainable from Celluforce) and beads of a copolymer of 2-ethylhexyl acrylate and methyl methacrylate (Acronal LR9014 from BASF, polymer beads (D) as defined above) are mixed so as to obtain an ink having a concentration of silver nanowires and a weight ratio of silver nanowires (B)/sulfated crystalline cellulose fibers (C)/polymer beads (D) as indicated in table 4.

The ink is applied to a polymer substrate using a draw-down bar (wet thickness varying from 4 to 12 µm, coating speed v=2″/sec; see table 4) to obtain a layer on said substrate. The applied layer is then dried at 135° C. for 5 min. In the examples 22 and 23 the substrate is an optical polycarbonate foil (e.g. commercially available under the product specification Makrofol DE 1-1 175 µm from Bayer Material Science). In examples 24 and 25, the substrate is an optical polyethylene terephthalate foil (Melinex 506, Dupont).

The sheet resistance Rsh given in Ohms/square (OPS) of the dried layer is measured by a four-point probe station (Lucas lab pro-4) and the optical properties are measured according to ASTM D1003, procedure A—Hazemeter by a haze-gard plus hazeometer (BYK Gardner). The results are compiled in table 4.

Examples 22-25 show that a composition according to the present invention is suitable for preparing an electroconductive layer having a light transmission of 80% or more measured according to ASTM D1003 (procedure A), on different substrates. The sheet resistance as well as the optical properties of the obtained electroconductive layer depend on the wet thickness of the applied ink.

TABLE 4

| Example No | Concentration of silvers nanowires (mg/ml) | Mass ratio silver nanowires/ (B) crystalline cellulose (C)/polymer beads (D) | Wet thickness (µm) | Rsh (OPS) | T (%) | H (%) | H (substrate subtracted) (%) |
|---|---|---|---|---|---|---|---|
| 22 | 4.68 | 10:6:4 | 6 | 48.895 | 89.95 | 1.5 | 1.37 |
| 23 | 4.68 | 10:6:4 | 8 | 27.30 | 89.25 | 2.16 | 2.03 |
| 24 | 4.68 | 10:6:4 | 6 | 90.80 | 91.575 | 1.91 | 1.48 |
| 25 | 4.68 | 10:6:4 | 8 | 44.45 | 90.325 | 2.69 | 2.26 |

In the following, specific embodiments of the present invention are described:

1. Composition comprising the constituents
   (A) water,
   (B) electroconductive nanoobjects,
      said electroconductive nanoobjects (B) having two external dimensions in the range of from 1 nm to 100 nm and their third external dimension in the range of from 1 μm to 100 μm,
      wherein said electroconductive nanoobjects (B) comprise one or more materials selected from the group consisting of silver, copper and gold,
      wherein the weight fraction of said electroconductive nanoobjects (B) is in the range of from 0.01 wt.-% to 1 wt.-% based on the total weight of the composition,
   (C) dispersed in the water, fibers of crystalline cellulose,
      said dispersed fibers (C) of crystalline cellulose having a length in the range of from 80 nm to 300 nm and a diameter in the range of from 5 nm to 30 nm, wherein the total weight fraction of said dispersed fibers (C) of crystalline cellulose is in the range of from 0.02 wt.-% to 5 wt.-%, based on the total weight of the composition.
2. Composition according to embodiment 1, wherein said electroconductive nanoobjects (B) have
   a length in the range of from 1 μm to 100 μm,
   and
   a diameter in the range of from 1 nm to 100 nm.
3. Composition according to any preceding embodiment wherein said electroconductive nanoobjects (B) are selected from the group consisting of nanowires.
4. Composition according to any preceding embodiment, wherein the ratio between
   the total weight of said electroconductive nanoobjects (B)
   and
   the total weight of said dispersed fibers (C) of crystalline cellulose
   is in the range of from 1:20 to 20:1.
5. Composition according to any preceding embodiment, further comprising one or more additional binding agents
   wherein the total weight fraction of said additional binding agents based on the total weight of the composition is equal to or less than the total weight fraction of dispersed fibers (C) of crystalline cellulose based on the total weight of the composition.
6. Composition according to any preceding embodiment wherein the composition does not comprise carbon nanotubes.
7. Composition according to any preceding embodiment wherein said fibers (C) of crystalline cellulose are fibers of sulfated crystalline cellulose.
8. Composition according to any preceding embodiment, comprising
   (A) water,
   (B) silver nanowires,
      said silver nanowires (B) having a length in the range of from 10 μm to 50 μm and a diameter in the range of from 3 nm to 30 nm,
      wherein the weight fraction of said silver nanowires (B) is 0.5 wt.-% or less, based on the total weight of the composition,
   (C) dispersed in the water, fibers of sulfated crystalline cellulose,
      said dispersed fibers (C) of crystalline cellulose having a length in the range of from 80 nm to 150 nm and a diameter in the range of from 5 nm to 10 nm, wherein the weight fraction of said dispersed fibers (C) of crystalline cellulose is less than 2 wt.-%, preferably 1.5 wt.-% or less, based on the total weight of the composition,
   wherein the ratio between
   the total weight of said silver nanowires (B)
   and
   the weight of said dispersed fibers (C) of sulfated crystalline cellulose
   is in the range of from 1:5 to 5:1.
9. Method for preparing an electroconductive layer having a light transmission of 80% or more measured according to ASTM D1003 (procedure A), on a substrate, comprising the steps of:
   preparing or providing a composition according to any of embodiments 1-8,
   applying said composition to a surface of a substrate,
   removing constituents which at 25° C. and 101.325 kPa are liquid from said composition applied to said surface of said substrate to such extent that a layer is formed on said surface of said substrate.
10. Method according to embodiment 9, wherein applying said composition to said surface of said substrate is carried out by means of a technique selected from the group consisting of spin coating, draw down coating, roll-to-roll coating, gravure printing, microgravure printing, screen-printing, flexoprinting and slot-die coating.
11. Method according to embodiment 9 or 10, wherein said substrate comprises a material selected from the group consisting of glass and organic polymers.
12. Method according to any of embodiments 9 to 11, wherein removing of those constituents, which are liquid at 25° C. and 101.325 kPa, from said composition applied to said surface of said substrate is achieved by subjecting said composition applied to said surface of said substrate to a temperature in the range of from 100° C. to 150° C. for a duration of 15 minutes or less.
13. Electroconductive layer having a light transmission of 80% or more measured according to ASTM D1003 (procedure A) and a sheet resistance of less than 300 Ohm/square as measured by the four point probe,
   wherein said electroconductive layer comprises constituents of a composition according to embodiments 1-8 which at 25° C. and 101.325 kPa are solid.
14. Electroconductive layer according to embodiment 13, wherein said electroconductive layer exhibits
   a haze of 2% or less as measured according to ASTM D1003 (procedure A),
   and
   a sheet resistance of 200 Ohm/square or less as measured by the four point probe.
15. Electroconductive layer according to embodiment 13 or 14, wherein said electroconductive layer exhibits one or more of
   a haze of 1% or less as measured according to ASTM D1003 (procedure A),
   a sheet resistance of 100 Ohm/square or less as measured by the four point probe,
   a light transmission of 90% or more as measured according to ASTM D1003 (procedure A).

16. Article comprising
a substrate having a surface
and
an electroconductive layer according to any of embodiments 13-15 arranged on at least a portion of said surface of said substrate.

17. Article according to embodiment 16, wherein said electroconductive layer has a thickness in the range of from 10 nm to 1000 nm, preferably of from 50 nm to 500 nm.

18. Use of a composition according to any of embodiments 1-8 for the preparation of an item selected from
an electroconductive layer according to any of embodiments 13-15
an article according to any of embodiments 16 and 17.

The invention claimed is:

1. A composition, comprising:
(A) water,
(B) electroconductive nanoobjects,
said electroconductive nanoobjects (B) having two external dimensions in the range of from 1 nm to 100 nm and their third external dimension in the range of from 1 μm to 100 μm,
wherein said electroconductive nanoobjects (B) comprise one or more materials selected from the group consisting of silver, copper and gold,
wherein a weight fraction of said electroconductive nanoobjects (B) is in the range of from 0.01 wt.-% to 1 wt.-% based on the total weight of the composition,
(C) dispersed in the water, fibers of crystalline cellulose,
said dispersed fibers (C) of crystalline cellulose having a length in the range of from 80 nm to 300 nm and a diameter in the range of from 5 nm to 30 nm,
wherein the total weight fraction of said dispersed fibers (C) of crystalline cellulose is in the range of from 0.02 wt.-% to 5 wt.-%, based on the total weight of the composition.

2. A composition according to claim 1, wherein said electroconductive nanoobjects (B) have
a length in the range of from 1 μm to 100 μm,
and
a diameter in the range of from 1 nm to 100 nm.

3. A composition according to claim 1,
wherein said electroconductive nanoobjects (B) are selected from the group consisting of nanowires.

4. A composition according to claim 1, wherein the ratio between
the total weight of said electroconductive nanoobjects (B) and
the total weight of said dispersed fibers (C) of crystalline cellulose is in the range of from 1:20 to 20:1.

5. A composition according to claim 1, further comprising one or more additional binding agents,
wherein the total weight fraction of said additional binding agents based on the total weight of the composition is equal to or less than the total weight fraction of dispersed fibers (C) of crystalline cellulose based on the total weight of the composition.

6. A composition according to claim 1, wherein the composition does not comprise carbon nanotubes.

7. A method for preparing an electroconductive layer, on a substrate,
the method comprising:
applying a composition according to claim 1 to a surface of a substrate,
removing constituents which at 25° C. and 101.325 kPa are liquid from said composition applied to said surface of said substrate to such extent that a layer is formed on said surface of said substrate,
wherein said electroconductive layer has a light transmission of 80% or more measured according to ASTM D1003 (procedure A).

8. A method according to claim 7, wherein said substrate comprises a material selected from the group consisting of glass and organic polymers.

9. A method according to claim 7, wherein said removing is achieved by subjecting said composition applied to said surface of said substrate to a temperature in the range of from 100° C. to 150° C. for a duration of 15 minutes or less.

10. An electroconductive layer, that comprises the composition according to claim 1 which at 25° C. and 101.325 kPa are solid,
wherein the electroconductive layer has a light transmission of 80% or more measured according to ASTM D1003 (procedure A) and a sheet resistance of less than 300 Ohm/square as measured by the four point probe,
and
wherein said electroconductive layer exhibits a haze of 2% or less as measured according to ASTM D1003 (procedure A),
and
a sheet resistance of 200 Ohm/square or less as measured by the four point probe.

11. An electroconductive layer according to claim 10, wherein said electroconductive layer exhibits one or more of:
a haze of 1% or less as measured according to ASTM D1003 (procedure A), a sheet resistance of 100 Ohm/square or less as measured by the four point probe,
a light transmission of 90% or more as measured according to ASTM D1003 (procedure A).

12. An article, comprising:
a substrate having a surface
and
an electroconductive layer according to claim 10 arranged on at least a portion of said surface of said substrate,
wherein said electroconductive layer has a thickness in the range of from 10 nm to 1000 nm.

13. A method for preparing an article according to claim 12,
the method comprising:
applying a composition according to claim 1 to at least a portion of a surface of a substrate,
removing constituents which at 25° C. and 101.325 kPa are liquid from said composition applied to said surface of said substrate to such extent that a layer is formed on said surface of said substrate, to thereby form the article.

* * * * *

UNITED STATES PATENT AND TRADEMARK OFFICE
CERTIFICATE OF CORRECTION

PATENT NO.         : 10,392,519 B2
APPLICATION NO.    : 15/503951
DATED              : August 27, 2019
INVENTOR(S)        : Herve Dietsch et al.

It is certified that error appears in the above-identified patent and that said Letters Patent is hereby corrected as shown below:

In the Specification

Column 9, Line 61, after "binding" delete "to".

Column 10, Line 41, before "preferably" delete "to".

Column 13, Line 67, after "haze" insert --.--.

Column 15, Line 27, delete "sec)" and insert --sec--.

Signed and Sealed this
Tenth Day of March, 2020

Andrei Iancu
*Director of the United States Patent and Trademark Office*